US006824876B2

(12) United States Patent
Swei et al.

(10) Patent No.: US 6,824,876 B2
(45) Date of Patent: Nov. 30, 2004

(54) BELT JOINT ADHESIVE

(75) Inventors: Gwo Shin Swei, East Amherst, NY (US); Jony Wijaya, Williamsville, NY (US); Shyiguei Hsu, McAllen, TX (US)

(73) Assignee: Saint-Gobain Abrasives Technology Company, Worcester, MA (US)

( * ) Notice: Subject to any disclaimer, the term of this patent is extended or adjusted under 35 U.S.C. 154(b) by 85 days.

(21) Appl. No.: 09/886,846

(22) Filed: Jun. 21, 2001

(65) Prior Publication Data

US 2003/0003309 A1 Jan. 2, 2003

(51) Int. Cl.[7] .................................................. B32B 27/40
(52) U.S. Cl. .............................. 428/423.1; 428/425.1; 428/144; 428/143
(58) Field of Search ...................... 428/423.1, 425.1, 428/144, 143

(56) References Cited

U.S. PATENT DOCUMENTS

| | | | |
|---|---|---|---|
| 3,252,848 A | * | 5/1966 | Borsellino et al. ....... 156/307.3 |
| 3,763,604 A | | 10/1973 | Malloy |
| 3,770,555 A | * | 11/1973 | Gladstone et al. .......... 156/137 |
| 4,027,435 A | | 6/1977 | Malloy |
| 4,046,744 A | | 9/1977 | Jenkins |
| 4,111,666 A | * | 9/1978 | Kalbow ........................ 51/295 |
| 4,144,219 A | | 3/1979 | Malloy |
| 4,194,618 A | | 3/1980 | Malloy |
| 4,450,099 A | | 5/1984 | Lewis et al. |
| 4,699,824 A | * | 10/1987 | Pufahl ......................... 428/220 |
| 4,803,257 A | * | 2/1989 | Goel ............................ 528/45 |
| 5,256,227 A | | 10/1993 | Roelofs |
| 5,290,903 A | | 3/1994 | Hsu et al. |
| 5,519,095 A | | 5/1996 | Case |
| 5,575,873 A | | 11/1996 | Pieper et al. |
| 5,595,804 A | | 1/1997 | Korbel |
| 5,786,437 A | | 7/1998 | Nicholas |
| 5,840,141 A | | 11/1998 | Korbel |
| 5,919,549 A | * | 7/1999 | Van et al. ................... 428/141 |
| 6,111,048 A | | 8/2000 | Asahina et al. |

OTHER PUBLICATIONS

Oertel, Gunter, ed. Polyurethane Handbook, 2nd ed. Hanser Publishers, New York: 1993, pp. 93–94.*

* cited by examiner

Primary Examiner—James J. Seidleck
Assistant Examiner—Melanie Bissett
(74) Attorney, Agent, or Firm—Joseph P. Sullivan; Hamilton, Brook, Smith & Reynolds, P.C.

(57) ABSTRACT

An adhesive for use in coated abrasive belt joints includes a blocked isocyanate, urethane system. The blocking agent can include phenols, oximes, alcohols, caprolactam, and diethyl malonate. The adhesive can be crosslinked with amine or alcohol. A coated abrasive belt is formed by attaching a plurality of abrasive particles to a first surface of a backing layer. A size coat is deposited over the abrasive particles to form a coated abrasive. The coated abrasive is cut to form a strip having a first end and a second end. The ends of the strip are joined with an adhesive including a blocked isocyanate, urethane system.

3 Claims, 2 Drawing Sheets

BELT JOINT ADHESIVE

BACKGROUND OF THE INVENTION

Coated abrasive materials are usually produced in large rolls from which the desired commercial product is cut by an automated process. One of the most useful forms of coated abrasive is in the form of a belt. For many years, endless abrasive belts and cones have been made by splicing the ends of lengths of coated abrasive sheet material. Because of the conventional manufacturing process, each such belt must be produced from a strip of suitable dimensions with the ends of the strip joined together to make a continuous loop.

Two types of splices are common, and this may be done by profiling each end such that, when overlapped and joined, the belt has a substantially uniform cross-sectional thickness across the joined area. This is known as a "lap" joint in which the ends of the length are beveled by removing abrasive granules from one end and part of the backside from the other end, and the beveled ends are overlapped and joined adhesively.

Alternatively, both ends of the strip to be joined to form the belt can be hollowed on the non-abrasive-bearing surface to accommodate a joining strip that is bonded to each of the hollowed ends. This is known as a "butt" joint. In the so-called "butt" splice, the backside at each end of a length of coated abrasive sheet material is scuffed to form a hollowed out space which is filled with an adhesive along with a strong, thin, tear-resistant splicing tape. Often, each type of splice is formed in a heated splicing press to be of substantially the same thickness as the remainder of the belt or cone.

The material of the backing on which the abrasive material is carried can be a woven or non-woven fabric, a plastic film or sheet or a paper of suitable durability. Most backings of endless abrasive belts and cones are cloth, paper, polymeric film, or laminates thereof. Cloth backings provide durable backings but are expensive and, to have suitably smooth surfaces, can require a series of coating treatments that can make cloth backings even more expensive. Paper and laminates of polymeric film and paper afford intermediate durability and are often used where cloth would be too expensive. For light duty, backings can be polymeric film, the backside of which usually has a resinous coating that is porous.

To form the joint, it is conventional to prepare the ends by treating them to ensure that the adhesive penetrates and bonds firmly to the substrate. This is particularly important if the backing has been given a substantial backfill treatment. Where the backing is a fabric, the ends can be sandblasted to open up the exposed fiber ends and allow penetration of the adhesive into the material of the backing.

The adhesive used must meet demanding standards to ensure that the belt joint remains intact throughout the useful life of the belt. This is important since a sudden joint failure while the belt is in use could be very dangerous to both the machine and the operator.

SUMMARY OF THE INVENTION

Two component polyurethane adhesive systems have been generally used as the adhesives in joining coated abrasive belts. The adhesive systems, which produce tough and flexible bonds, generally consist of high molecular weight urethane and a multi-functional isocyanate crosslinking agent.

However, due to the high reactivity of isocyanate with materials such as amine, alcohol, and water, the two component polyurethane systems suffers at least two drawbacks in manufacturing environments including limited pot life and sensitivity to the relative humidity of the ambient air. FIG. 1 shows a graph which displays the variation of the quality of a belt joint of a typical prior art joint system with the age of the system. The graph shows a pot life for that system of about four hours.

A blocked isocyanate urethane system is based on reversibility of the addition reactions of isocyanates at elevated temperatures. It is relatively stable at ambient temperature, but when heated the isocyanate undergoes a de-blocking reaction, i.e., the release of the blocking agent, to the isocyanate before reaction of the isocyanate with a nucleophile, for example, a hydroxyl.

During the formation of the polyurethane adhesive, a polymerization reaction occurs between an isocyanate (—NCO) group in a isocyanate component and a group in a hydroxyl component containing an active hydrogen group, such as a hydroxyl group in a polyol. The isocyanate component contain two or more isocyanate groups and the hydroxyl component contains two or more hydroxyl groups.

The isocyanate group of the isocyanate group is blocked so that it cannot react with the active hydrogen groups of the hydroxyl component, such as a polyol. The blocking group is removed from the isocyanate group by heating to an elevated temperature, thereby allowing the exposed isocyanate group to react with a hydroxyl group and form the polyurethane. The polyurethane formed by this method is considered a blocked isocyanate urethane system.

It has been discovered that blocked isocyanate urethane systems greatly improve pot life and minimize environmental concerns. In one embodiment, an adhesive for use in coated abrasive belt joints includes a blocked isocyanate, urethane system. The blocking agent can include phenols, oximes, alcohols, caprolactam, and diethyl malonate. In one embodiment, the adhesive is crosslinked with an amine. In another embodiment, the adhesive is crosslinked with an alcohol.

A coated abrasive belt is formed by attaching a plurality of abrasive particles to a first surface of a backing layer. A size coat is deposited over the abrasive particles to form a coated abrasive. The coated abrasive is cut to form a strip having a first end and a second end. The ends of the strip are joined with an adhesive including a blocked isocyanate, urethane system.

BRIEF DESCRIPTION OF THE DRAWINGS

The foregoing and other objects, features and advantages of the invention will be apparent from the following more particular description of preferred embodiments of the invention, as illustrated in the accompanying drawings. The drawings are not necessarily to scale, emphasis instead being placed upon illustrating the principles of the invention.

DETAILED DESCRIPTION OF THE INVENTION

Figure 1:
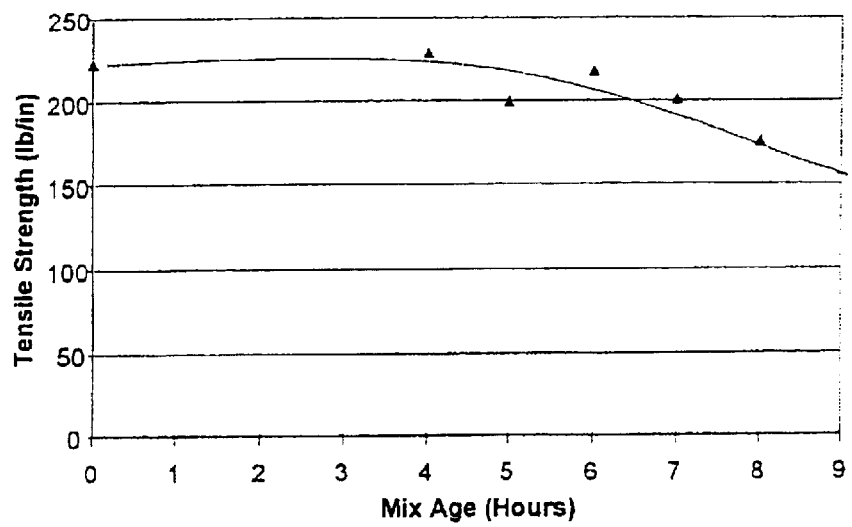
FIG. 1 shows the variation of the quality of a belt joint of a typical prior art joint system with the age of the system.

Coated abrasives generally include those products having abrasive grits adhered to a support backing which can be used to abrade or otherwise wear down a surface of an article to which they are applied.

The support backing of a coated abrasive can be rigid, but generally is flexible and typically includes a web of material, such as paper, cloth, fibrous pad, polymeric film, vulcanized fiber, metallic net or a combination of such materials and the like. In some applications, the support backing initially includes a collection of loose fibers, to which the abrasive grits are added, with or without further binder material, to provide an abrasive web having grits throughout. The loose collection of fibers and grits can be compressed, if no adhering binder is present, or otherwise fixed or cured when a binder is present to form the coated abrasive.

The abrasive grits can generally be any material which has the capability of abrading a workpiece article and typically includes sand, flint, corundum, metallic oxides such as aluminum oxide, aluminum-zirconia, ceramic alumina, diamond, silicon carbide, garnet, and the like. The grits can be embedded into or intermingled with a binder material by which they are adhered to a support backing. The grits can be applied in a specific pattern or may be randomly distributed.

The binder material is generally any convenient material which can act to adhere the grits to the support backing and have resistance to negating the abrading process. Typical binder materials include the phenolic resins, hide glues, varnishes, epoxy resins, acrylates, urea formaldehyde resins, polyurethane resins, lacquers, enamels and any of a wide variety of other materials which have the ability to stabilize the grits in adhering relationship to the support backing. Generally, the binding material is chosen to provide maximum efficiency of the coated abrasive for the abrading surface contemplated. Care is taken in selecting binder materials which can resist softening or burning or both due to overheating yet provide adequate adherence.

The grits can be mixed with the binder material and the mixture deposited on the support backing in a uniform or patterned form. Alternatively, the support backing may be coated with the binder material and the grits thereafter deposited thereon. Many alternate forms of support backings, granular materials, binder materials, means of arranging the grits on the support backing, means of adhering the grits and the like are known in the prior art and are seen as variations contemplated as within the scope of this invention. To form coated abrasive belts, the coated abrasive is cut into strips and spliced together with an adhesive.

During the formation of the polyurethane adhesive, a polymerization reaction occurs between an isocyanate (—NCO) group in an isocyanate component and a group in a hydroxyl component containing an active hydrogen group, such as a hydroxyl group in a polyol. The isocyanate component contains two or more isocyanate groups and the hydroxyl component contains two or more hydroxyl groups. Where there are three or more isocyanate or hydroxyl groups on a component, crosslinking is possible between chains. Crosslinkers can be added to enhance crosslinking.

The isocyanate group of the isocyanate component are blocked so that they cannot react with the active hydrogen groups of the hydroxyl component, such as a polyol. The blocking group is removed from the isocyanate group by heating to an elevated temperature, thereby allowing the exposed isocyanate group to react with a hydroxyl group.

A blocked isocyanate system is based on reversibility of the addition reactions of isocyanates at elevated temperatures. It is relatively stable at ambient temperature, but when heated undergoes a deblocking reaction, i.e., the release of the blocking agent, to the isocyanate before reaction with a nucleophile, for example, an alcohol or amine. The reactions pathway is illustrated as follows:

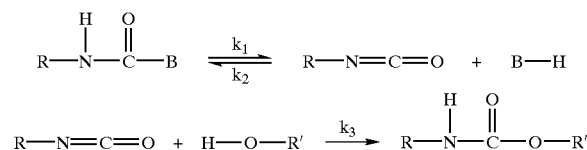

R and R' represent organic groups or chains. B represents the blocking agent. Some of the blocking agents used commercially are phenols, oximes, alcohols, caprolactam, and diethyl malonate. The choice of the blocking agent depends in part on its volatility and processing temperature. Some of the advantages of the blocked isocyanate in coated abrasive belt joint applications are its long pot life and insensitivity to moisture levels of the ambient air. This leads to a process with more consistent quality of the belt joint.

A polyurethane with adequate physical properties for a belt joint adhesive includes a high molecular weight. In order to achieve this, one of the components is a prepolymer. The prepolymer includes a number of repeating units but also includes at least two reactive groups, usually at the end of a substantially linear polymer.

In one of two approaches, a prepolymer includes isocyanate groups that are blocked. The blocked isocyanate prepolymer is mixed with a hydroxyl component and is then heated to remove the blocking agents, which allows the polyurethane reaction to proceed.

In a second approach, a simple isocyanate, such as diisocyanate which has the isocyanate groups blocked, is mixed with a prepolymer having hydroxyl groups, such as a polyol. The mixture is heated to remove the blocking agent and form a polyurethane.

A blocked polyisocyanate, which is obtained by blocking the terminal isocyanate groups of a non-blocked polyisocyanate derived from an aliphatic and/or an alicyclic diisocyanate with a blocking agent, is stable at ambient temperature. However, upon heating the blocked polyisocyanate, the blocking groups dissociate from the terminal isocyanate groups of the blocked polyisocyanate, and the resultant deblocked polyisocyanate can serve as a curing agent for a polyol. The polyurethane composition can include a polyol as a main agent and the blocked polyisocyanate as a curing agent, and is capable of providing an adhesive having excellent properties, such as chemical resistance, flexibility and weatherability. The choice of blocking agents includes phenol, cresol, ethyl acetoacetate, diethyl malonate, and butanone oxime. The deblocking temperatures range from 100 to 180° C. depending on the specific blocking agent and the formulation.

The polyisocyanate can include a diisocyanate selected from the group consisting of an aliphatic diisocyanate and an alicyclic diisocyanate. For the aliphatic diisocyanate, a $C_4$–$C_{30}$ aliphatic diisocyanate is suitable, and for the alicyclic diisocyanate, a $C_8$–$C_{30}$ alicyclic diisocyanate is suitable. Examples of diisocyanates include tetramethylene-1,4-diisocyanate, pentamethylene-1,5-diisocyanate, hexamethylene diisocyanate, 2,2,4-trimethylhexamethylene-1,6-diisocyanate, lysine diisocyanate, isophorone diisocyanate, 1,3-bis(isocyanatomethyl)-cyclohexane and 4,4'-dicyclohexylmethane diisocyanate. Among them, hexamethylene diisocyanate and isophorone diisocyanate are suitable examples. The above-referenced diisocyanates can be used individually or in combination.

Examples of polyols include polyether polyols obtained by addition-bonding at least one organic oxide selected from the group consisting of alkylene oxides (such as ethylene oxide, propylene oxide, butylene oxide and cyclohexene oxide) and phenylalkylene oxides (such as styrene oxide and phenylpropylene oxide) to at least one of the above-referenced polyhydroxy compounds in the presence of a strongly basic catalyst (such as hydroxides of lithium, sodium and potassium; alcoholates; and alkylamines); polyether polyols obtained by reacting multi-functional compounds, such as ethylenediamine, with an alkyleneoxide; and polymeric polyols obtained by polymerizing acrylamide or the like using the above-referenced polyethers as reaction media.

Examples of polyester polyols include polyester polyol resins obtained by a condensation reaction of at least one organic dibasic acid (selected from succinic acid, adipic acid, sebacic acid, dimer acid, maleic anhydride, phthalic anhydride, isophthalic acid and terephthalic acid) with at least one polyhydric alcohol (selected from ethylene glycol, propylene glycol, diethylene glycol, neopentyl glycol, trimethylolpropane and glycerin); and polycaprolactam polyols, which are obtained by ring-opening, addition polymerization of ε-caprolactam with a polyhydric alcohol.

Examples of epoxy polyols include epoxy polyols of a novolak type, a β-methylepichlorohydrin type, a cyclic oxirane type, a glycidyl ether type, a glycol ether type, an epoxidized aliphatic unsaturated compound type, an epoxidized fatty acid ester type, a polycarboxylic ester type, an aminoglycidyl type, an epoxidized halogenated compound type, and a resorcin type.

The above-referenced polyols have the number average molecular weight of preferably from 500 to 5,000. The above-referenced polyols can be used individually or in combination. Further, the above-referenced polyols can be urethane-modified prior to use thereof.

Examples of a suitable curing agent include aromatic amines, such p,p'-methylene dianiline (MDA), 4,4'-methylene-bis-(2-chloroaniline) (MOCA), Ethacure-100 (diethyltoluenediamine), -220, -300 or other amines of similar structure. Polyols, such as trimethylol propane (TMP), glycols of various backbones, aromatic polyols, can be added to the aromatic amine as a co-curing agent for the blocked polyurethane prepolymer. The —NCO/—OH ratio is in the range of between about 0.9 and 1.1. In a preferred embodiment, the ratio is about one.

In respect to the blocked polyisocyanate, which has been used as a curing agent for a one-pack polyurethane composition, the composition is heated to high temperatures, such as 120° C., for releasing the blocking agent from the terminal isocyanate groups of the blocked polyisocyanate so as for the polyisocyanate to function as a curing agent. For example, when an adhesive is formed by baking from a one-pack polyurethane composition including a polyol as a main agent and a blocked polyisocyanate as a curing agent, the heating can be conducted at a temperature in the range of between about 100 and 200° C.

Examples of commercially available blocked isocyanate prepolymers include Desmocap and Baypret of Bayer, Adiprene BL-16 of Uniroyal, and Catapol of ARNCO.

Thus, in accordance with the present invention, a method for forming a coated abrasive belt includes forming a blocked isocyanate, urethane system by mixing a blocked isocyanate component with a hydroxyl component, joining ends of a strip of coated abrasive with the blocked isocyanate, urethane system, and heating the strip to remove the blocking agent from the isocyanate group and allowing the unblocked isocyanate groups to react with the hydroxyl groups on the hydroxyl component.

In one embodiment, the first component includes a blocked isocyanate terminated polyurethane prepolymer and the second component includes polyamine or polyol. In an alternative embodiment, the first component includes a high molecular weight polymer containing multi-hydroxyl functionality and the second component includes blocked polyisocyanate.

The following illustrations show the benefits of the use of blocked isocyanate belt joint adhesive systems.

EXAMPLE 1

Figure 2:
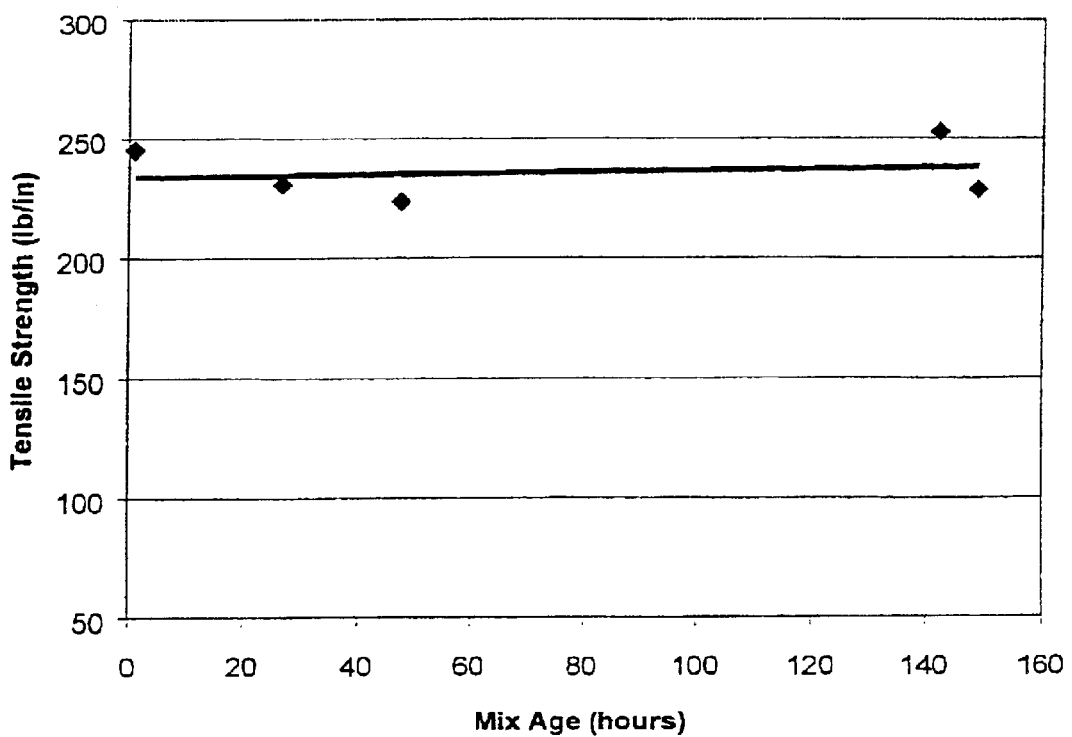
FIG. 2 shows the tensile strength of a belt joint as a function of mix age made in accordance with the present invention.

FIG. 2 shows the belt joint adhesive strength as a function of mix age. The mix includes Adiprene BL16 (urethane elastomer with blocked-isocyanate curing sites) and Ethacure 100 (diethyltoluenediamine). The plot clearly shows that the tensile strength of the belt joint was not affected by mix age in the range of between zero and 140 hours.

EXAMPLE 2

Figure 3:
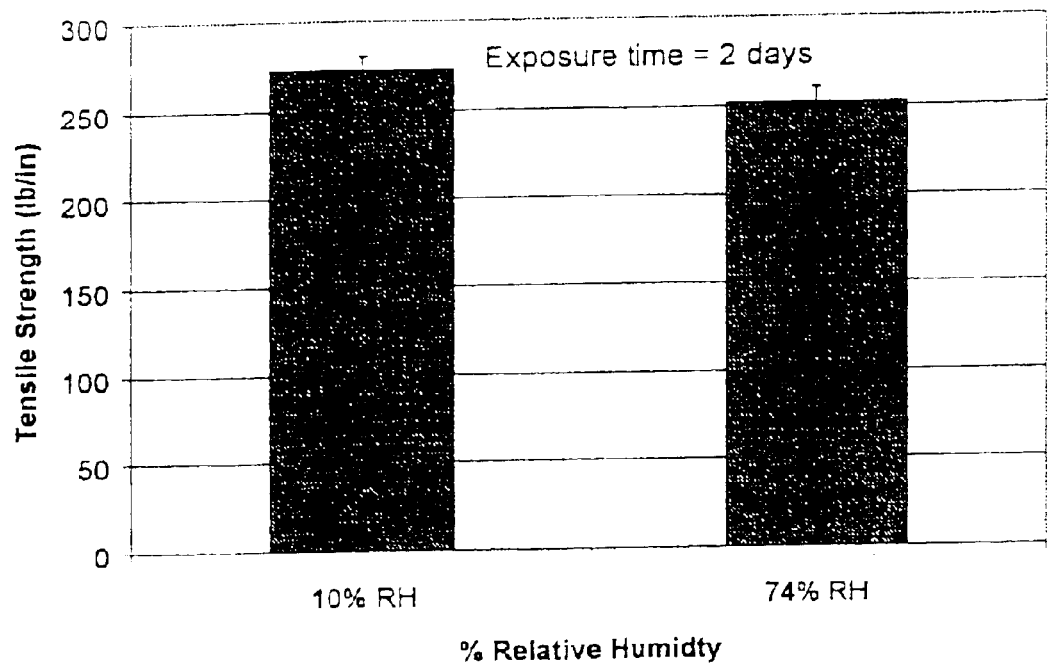
FIG. 3 shows the tensile strength of a belt joint as a function of relative humidity made in accordance with the present invention.

FIG. 3 shows the belt joint adhesive strength as a function of relative humidity. Samples were exposed in the constant relative humidity for two days. Exposure of the belt joint adhesive to humid environment did not affect the belt-joint performance.

EXAMPLE 3

A system that included a polyester urethane (Bayer Desmolco 1976), P5 ninety parts; a blocked isocyanate, TDI based (Bayer, BL1265) 6.15 parts; catalyst 0.9 parts; and methylethyl ketone 0.5 parts. The blocked agent employed was caproleactam. The adhesive was cured at 121° C. (250° F.). Two samples averaged a tensile strength of 40.6 kg/in (227.1 lb/in) for a fresh mix. Three samples averaged a tensile strength of 40.4 kg/cm (224.2 lb/in) after being kept in a pot for twenty-four hours and then cured at 121° C. The data indicates that the performance of the adhesive is not affected by the time the system was kept in the pot.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for forming a coated abrasive belt comprising:
   (a) forming a blocked isocyanate urethane system that includes a high molecular weight polyurethane containing hydroxyl functionality and wherein the isocyanate of said system consists essentially of blocked isocyanate;
   (b) joining ends of a strip of coated abrasive with the blocked isocyanute urethane system; and
   (c) heating the strip to cure the blocked isocyanate urethane system.

2. A method for forming a coated abrasive belt, comprising:
   (a) forming a blocked isocyanate urethane system by mixing a first component that includes a high molecular weight polyurethane containing hydroxyl functionality with a second component that includes blocked polyisocyanate; wherein the isocyanate of said system consists essentially of blocked isocyanate;
   (b) joining ends of a strip of coated abrasive with the blocked isocyanate urethane system; and
   (c) heating the strip to cure the blocked isocyanate urethane system.

3. The method of claim 1, wherein the blocked isocyanate urethane system includes a high molecular weight prepolymer containing blocked isocyanate functionality.

* * * * *